United States Patent
Gaydos et al.

(10) Patent No.: US 11,909,649 B2
(45) Date of Patent: *Feb. 20, 2024

(54) EFFICIENTLY MANAGING NETWORK TRAFFIC

(71) Applicant: Comcast Cable Communications, LLC, Philadelphia, PA (US)

(72) Inventors: Robert Gaydos, Harleysville, PA (US); Nagesh Nandiraju, Willow Grove, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/672,070

(22) Filed: Feb. 15, 2022

(65) Prior Publication Data

US 2023/0006933 A1    Jan. 5, 2023

Related U.S. Application Data

(63) Continuation of application No. 15/857,938, filed on Dec. 29, 2017, now Pat. No. 11,284,300.

(60) Provisional application No. 62/440,593, filed on Dec. 30, 2016.

(51) Int. Cl.
| | |
|---|---|
| *H04W 28/08* | (2023.01) |
| *H04L 47/125* | (2022.01) |
| *H04W 72/0446* | (2023.01) |
| *H04N 21/61* | (2011.01) |
| *H04L 12/66* | (2006.01) |

(52) U.S. Cl.
CPC ....... *H04L 47/125* (2013.01); *H04W 72/0446* (2013.01); *H04L 12/66* (2013.01); *H04N 21/6118* (2013.01); *Y02D 30/70* (2020.08)

(58) Field of Classification Search
None
See application file for complete search history.

(56) References Cited

U.S. PATENT DOCUMENTS

| | | | |
|---|---|---|---|
| 9,036,510 B1 | 5/2015 | Zhou et al. | |
| 11,284,300 B2 * | 3/2022 | Gaydos | H04L 47/125 |
| 2002/0056132 A1 | 5/2002 | Wilson | |
| 2009/0028182 A1 | 1/2009 | Brooks et al. | |
| 2013/0137411 A1 | 5/2013 | Marin | |
| 2015/0067815 A1 | 3/2015 | Overcash | |
| 2016/0205591 A1 | 7/2016 | Hong et al. | |
| 2017/0041935 A1 | 2/2017 | Shanmugam et al. | |
| 2018/0049108 A1 | 2/2018 | Yang et al. | |

* cited by examiner

*Primary Examiner* — Mohammad S Adhami
(74) *Attorney, Agent, or Firm* — Banner & Witcoff, Ltd.

(57) ABSTRACT

Described herein is a system and method for a microservices architecture for dynamic channel migration based on real time traffic load. Traffic loads on a first and second radio frequency (RF) channels used by a transceiver to communicate with a plurality of modem devices may be monitored, where the first RF channel is transmitted at a higher frequency than the second RF channel. Based on the monitored traffic loads of the RF channels, data traffic may be migrated from the first RF channel to the second RF channel. Finally, the plurality of modem devices may be notified of the migration.

20 Claims, 13 Drawing Sheets

Time and Load aware scheduler, RF Channel steering

- Each vCMTS-D in a setup may operate with constant resources dedicated and schedules traffic on one or more (or all) channels.

1. vCMTS-C manages the profiles of all RPHYs. It collects information on the traffic load on each RPHY during the different time periods. This time period is tunable parameter (in order of minutes or hours).
    2. vCMTS-C learns and compiles information such as the range of CMs and capabilities on any RPHY (each RPHY may have different type of CMs and their capabilities may vary a lot)
    3. vCMTS-C instructs vCMTS-D when to operate in a lower capacity mode
    4. vCMTS-C provides vCMTS-D the set of base channels after calculating the minimum number of channels required to meet a traffic load.
    5. Resources for vCMTS-D sub-components will be resized (i.e., # of cores allocated for the containers will be dialed down) according to the load
    6. Depending on this, the need for containers and hence cores may vary during the day. vCMTS-D containers may be shuffled around from one server to another server. This helps in conserving power by turning off servers or for software maintenance of the server infrastructure.
    7. vCMTS-C will notify the RPHY to power on/off some RF channels depending on the load.
    8. vCMTS-D will notify CMs to tune to a common primary channel and preferably on the lower spectrum end.
    9. User experience and input can be used as a feedback to adjust the tuning and configuration of the resources adjustments.
        1. Some example ways are measuring user experience may include TCP DUP ACKs, Page load times, buffer lengths in vCMTS-D, etc.

FIG. 8

//EFFICIENTLY MANAGING NETWORK TRAFFIC

CROSS-REFERENCE TO RELATED APPLICATIONS

This application is a continuation of U.S. patent application Ser. No. 15/857,938, filed Dec. 29, 2017, which claims the benefit of U.S. Provisional Application No. 62/440,593, filed Dec. 30, 2016, all of the above of which are hereby incorporated by reference in their entireties.

BACKGROUND

Termination systems, such as a cable modem termination system, may communicate with a variety of end devices (e.g., modems) by transmitting and receiving data via preconfigured radio frequency (RF) channels. The RF channels may carry various streams of data, such as video programs, Internet content, application data, voice services, etc. However, maintaining these RF channels requires electrical power and processing resources, and there remains an ever-present need for improvements in efficiently managing the use of these RF channels to conserve electrical power and processing resources.

BRIEF DESCRIPTION OF THE DRAWINGS

Some features herein are illustrated by way of example, and not by way of limitation, in the figures of the accompanying drawings and in which like reference numerals refer to similar elements.

FIG. 8 illustrates an example flow process for a channel migration in accordance with aspects disclosed herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Various features of the methods and systems for tracking individual and aggregated viewership statistics for predictive purposes will be further described below. However, first an exemplary operating environment as shown in FIGS. 1 and 2 will be described.

Figure 1:
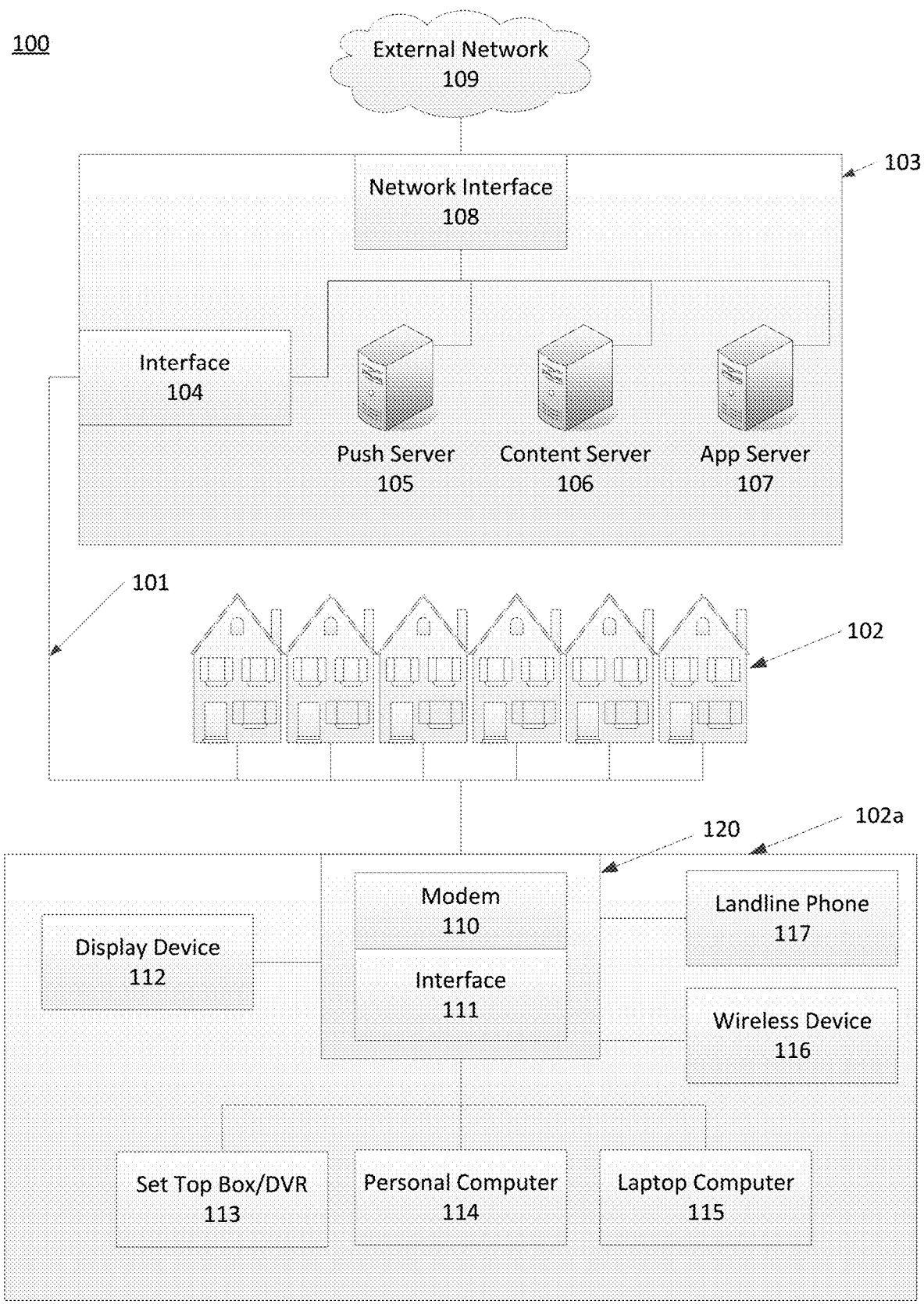
FIG. 1 illustrates an example information access and distribution network.
Figure 2:
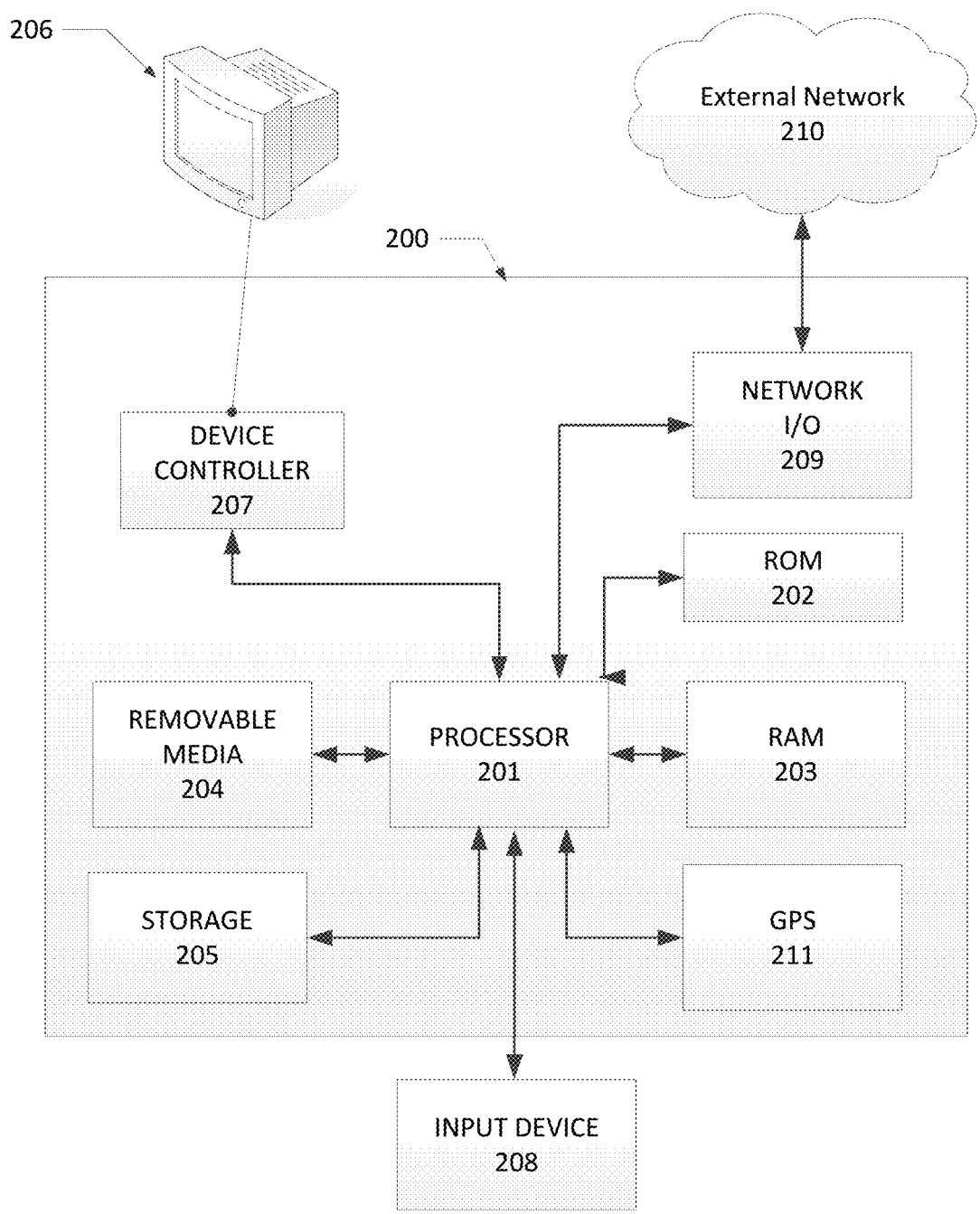
FIG. 2 illustrates an example hardware and software platform on which various elements described herein can be implemented.

FIG. 1 illustrates an example information access and distribution network 100 on which many of the various features described herein may be implemented. The network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as locations 102 (e.g., homes, businesses, institutions, etc.), to a local office 103 (e.g., a central office or headend). The local office 103 may transmit downstream information signals onto the links 101, and each location 102 may have a receiver used to receive and process those signals.

There may be one link 101 originating from the local office 103, and it may be split a number of times to distribute the signal to various locations 102 (e.g., a premises, a home, building, etc.) in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface 104 may be as specified in a standard, such as, in an example of an HFC-type network, the Data Over Cable Service Interface Specification (DOCSIS) standard, published by Cable Television Laboratories, Inc. (a.k.a. Cable-Labs), or it may be a similar or modified device instead. The interface 104 may be configured to place data on one or more downstream channels or frequencies to be received by devices, such as modems at the various locations 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the network 109, and to other devices on the network such as a cellular telephone network and its corresponding cell phones (e.g., cell phone 117).

As noted above, the local office 103 may include a variety of servers 105-107 that may be configured to perform various functions. For example, the local office 103 may include one or more push notification servers 105. A push notification server 105 may generate push notifications to deliver data and/or commands to the various locations 102 in the network (or more specifically, to the devices in the locations 102 that are configured to detect such notifications). The local office 103 may also include one or more data servers 106. A data server 106 may be one or more computing devices that are configured to provide data to users in the homes. This data may be, for example, video on demand movies, television programs, songs, text listings, etc. The data server 106 may include software to validate user identities and entitlements, locate and retrieve requested data, encrypt the data, and initiate delivery (e.g., streaming) of the data to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the locations 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example location 102a may include an interface 120. The interface 120 can include any communication circuitry needed to allow a device to communicate on one or more links 101 with other devices in the network 100. The interface 120 may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway 111 (e.g., a gateway interface device). The gateway 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Having described an example communication network shown in FIG. 1 in which various features described herein may be implemented, an example computing device as shown in FIG. 2 will be described.

FIG. 2 illustrates general hardware and software elements that can be used to implement any of the various computing devices (e.g., network devices, terminal devices, remote control devices, etc.) discussed herein. The computing device 200 may include one or more processors 201, which may execute instructions of a computer program to perform any of the features described herein. The instructions may be stored in any type of computer-readable medium or memory (e.g., a non-transitory computer-readable medium or memory), to configure the operation of the processor 201. For example, instructions may be stored in a read-only memory (ROM) 202, random access memory (RAM) 203, hard drive, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc.

The computing device 200 may also include one or more network interfaces 209, such as input/output circuits (such as a network card) to communicate with an external network 210. The interface 209 may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network. The computing device 200 may communicate with the external networks 210 or other devices using one or more communication protocols, such as wired communication protocols and wireless communication protocols (e.g., Wi-Fi, Bluetooth, ZigBee, Z-Wave, etc.).

The FIG. 2 example is a hardware configuration, although the illustrated components may be wholly or partially implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

Figure 3A:
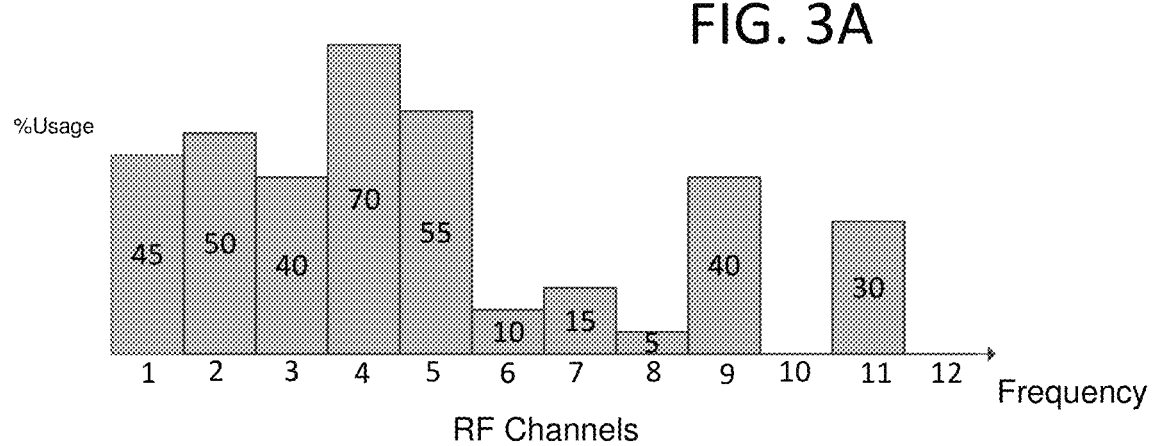
FIGS. 3A-B illustrate example Radio Frequency (RF) channels before and after a channel migration in accordance with aspects disclosed herein.
Figure 3B:
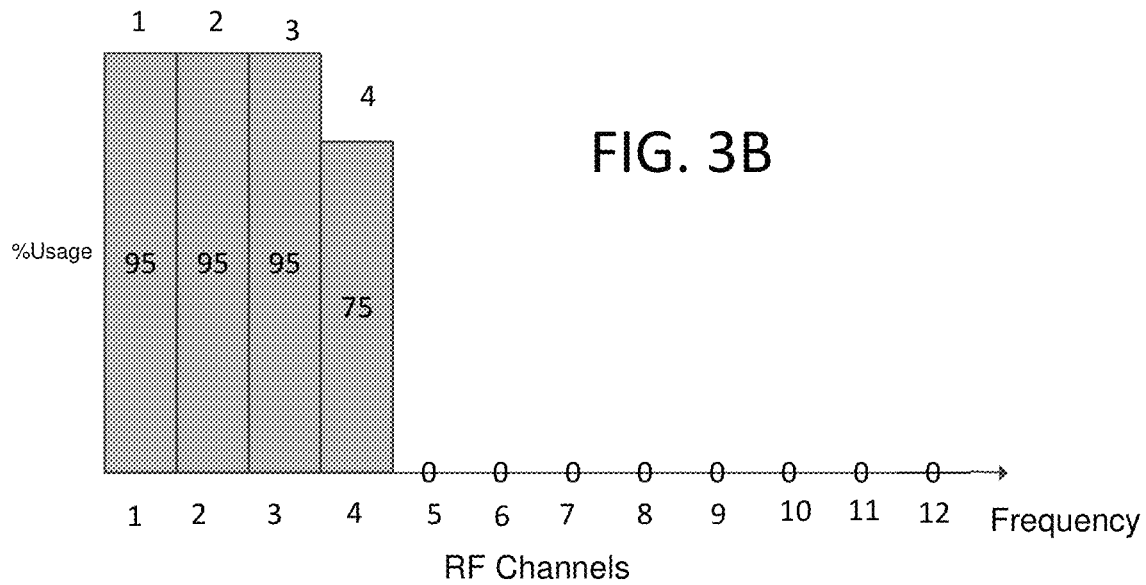

FIGS. 3A-B illustrate example Radio Frequency (RF) channels before and after a channel migration in accordance with aspects disclosed herein. As illustrated in FIG. 3A before a channel migration, a head end may allocate twelve RF channels for the transmission (such as downstream communication) from the transceiver to a group of modem devices. Channel 1 occupies a lowest portion of the RF spectrum, while channel 12 occupies a highest portion of the RF spectrum. In this example, the head end monitors the traffic load at a given point of time, that channel 1 is at 45% capacity, channel 2 is at 50% capacity, channel 3 is at 40% capacity, channel 4 is at 70% capacity, etc. Notably, channels 10 and 12 at the higher portion of the RF spectrum with zero load may be candidates to be consolidated to yield a subset of the twelve RF channels. In the FIG. 3A example, processing resources might be running to support all twelve of the RF channels, but the traffic load across these channels can be consolidated into fewer RF channels. As a result, since lower-frequency channels require less electrical power to transmit, this consolidation may fill lower frequency RF channels before filling higher frequency RF channels.

FIG. 3B illustrates the status of the RF channels after the channel migration. For example, if the aggregated traffic load from all RF channels is below a migration threshold, the head end may perform a channel migration on the twelve RF channels as shown in FIG. 3A. Channel migration may involve moving data traffic from higher frequency channels, and reassigning or consolidating them to lower-frequency channels. Doing so may allow one or more of the higher-frequency channels to be deactivated, thereby conserving power and processing resources.

As illustrated in the example of FIG. 3B, after the channel migration, Channels 1-3 are at 95% capacity, Channel 4 is at 75% capacity, while Channels 5-12 have zero capacity. In this example, Channels 1-4 may reserve 5% of the capacity for potential data expansion within a certain period of time. Alternatively, a higher percentage of capacity may be reserved on an RF channel for future data expansion if more volatile or unpredictable data such as voice data over a telephone line is transmitted on the RF channel. As a result of the channel migration, Channels 1-4 constitute the subset of RF channels to accommodate the data traffic after the channel migration, and Channels 5-12 may be released and the corresponding resources such as the containers supporting Channels 5-12 may be freed or repurposed to be used for supporting RF channels configured for other transceivers.

Figure 4:
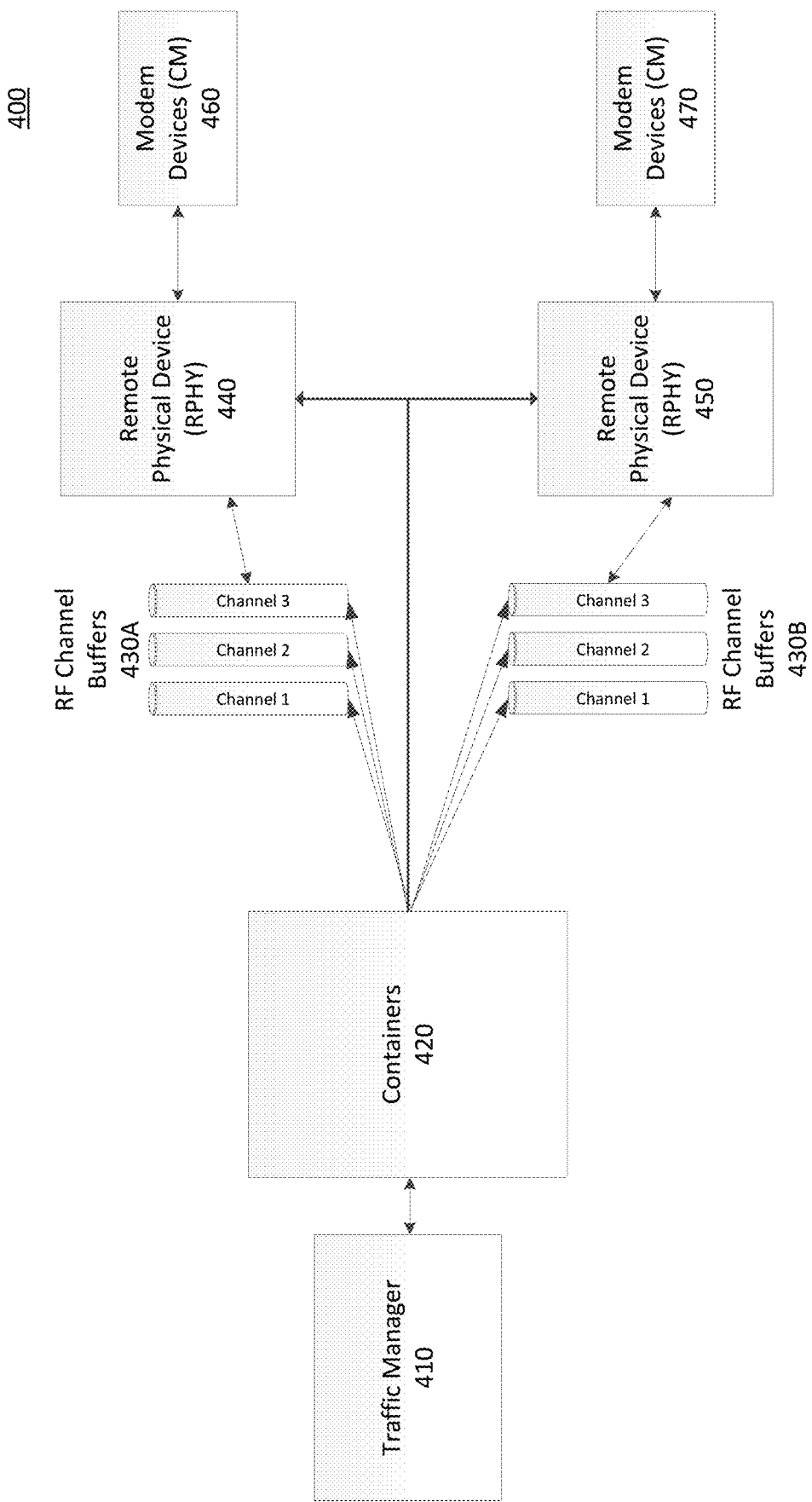
FIG. 4 illustrates an example schematic block diagram for a system implementing channel migration in accordance with aspects disclosed herein.

FIG. 4 illustrates an example schematic block diagram for a system implementing channel migration in accordance with aspects disclosed herein. Referring to FIG. 4, system 400 may include traffic manager 410, containers 420, RF channel buffers 430A and B, remote physical devices (RPHY) 440 and 450, and modem devices 460 and 470. Traffic Manager 410, containers 420, remote physical devices (RPHY) 440 and 450, and modem devices 460 and 470 may include one or more physical components, such as one or more processors, memories, communication interfaces, and/or the like.

Traffic manager 410 is a computing device that may receive data packets for downstream or upstream transmission, classify data packets into service flows, perform scheduling of the transmission for the data packets, and buffer the data packets before sending them to containers 420 for further processing. Containers 420 may be computing devices that implement RF channel buffers 430A and B in the memory and are responsible for managing the data traffic that is to be carried on a particular RF channel. As such, containers 420 may receive a data packet from traffic manager 410, perform packaging of the data packet, select an RF channel, put the data packet into RF channel buffers 430 A or B waiting to be transmitted by remote physical devices (RPHY) 440 or 450. The number of containers and RF channels may be scalable based on the usage level. For example, the number of containers may be increased based on the amount of traffic load monitored in real time on remote physical devices (RPHY) 440 and 450.

Remote physical devices (RPHY) 440 and 450 may be transceivers that convert RF signals into data packets in an upstream transmission, and convert data packets to RF signals in a downstream transmission. Remote physical devices (RPHY) 440 and 450 may be located in a proximity to servers executing the CMTS software or may be located remotely from the server. The transceiver may be an antenna connected to a coaxial cable at the CMTS, and that coaxial cable (which may have portions implemented in fiber) then extends to the various homes in a particular region serviced by the CMTS.

A transceiver may be configured to communicate with a pool of modem devices such as modem devices 460 or 470 in a service group, via a plurality of RF channels configured for the transceiver. For example, a container may recognize a data packet targeted for a service group including RPHY 440 and modem devices 460, and put the data packet in RF channel buffers 430A configured for that service group. RPHY 440 may subsequently convert the data packet to RF signal and transmit the RF signal to modem devices 460 via the RF channels configured for RPHY 440. In a downstream transmission, remote physical devices (RPHY) 440 and 450 may receive fiber signals as input and may output coax (e.g., RF) signals. For example, a blade server may transmit data packets via a 10-gigabit link to remote physical devices (RPHY) 440 and 450. The blade server, such as push server 105, content server 106 or app server 107 in FIG. 1, may be plugged into a network switch, and that network switch may run a 10 gigabit link to physical devices (RPHY) 440 and 450, which may subsequently convert the fiber signals into DOCSIS data (e.g., RF signal) and may send the DOCSIS data to modem devices 460 and 470.

Figure 5A:
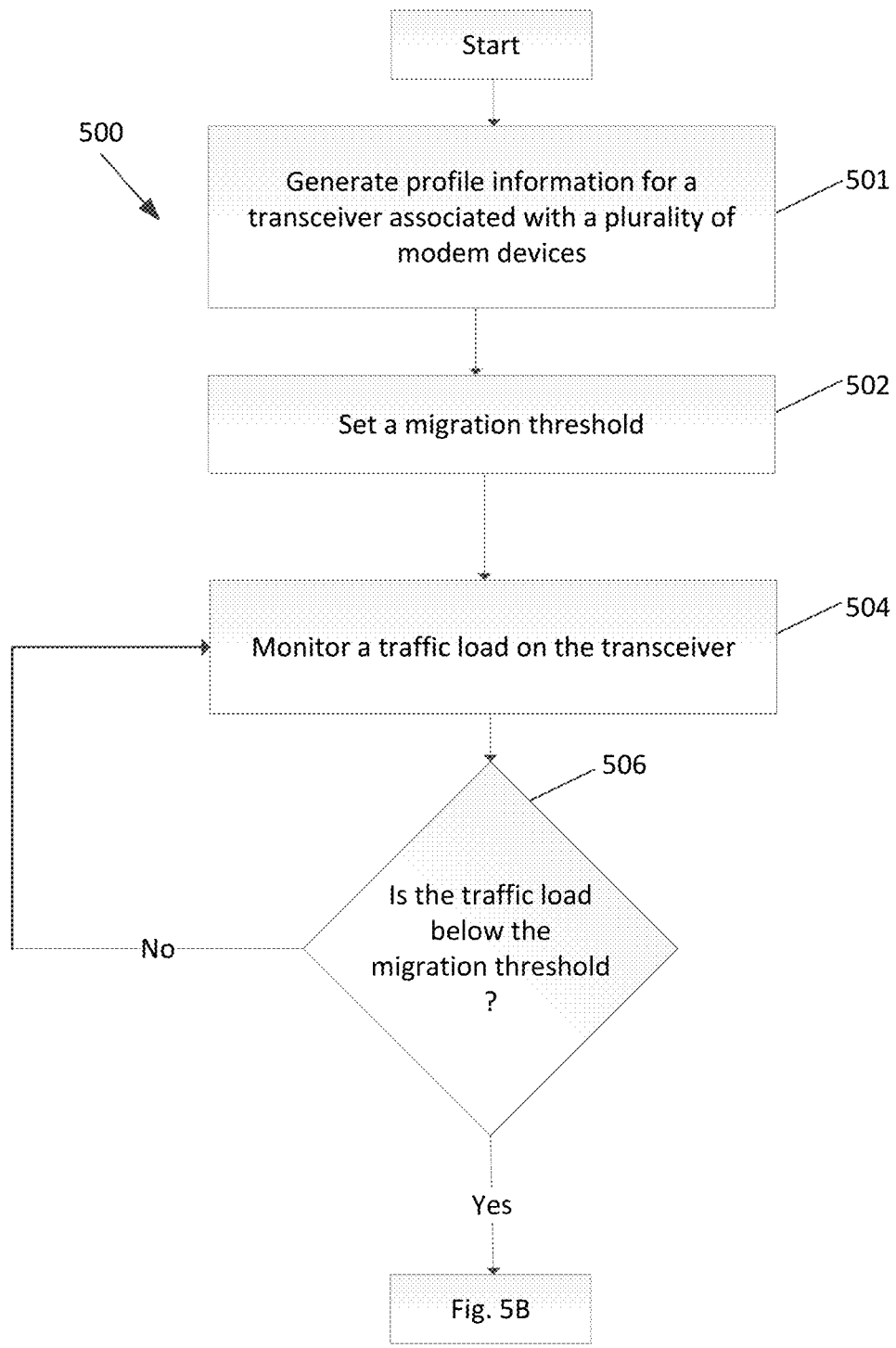
FIGS. 5A-C illustrate an example flow process for channel migration in accordance with aspects disclosed herein.
Figure 5B:
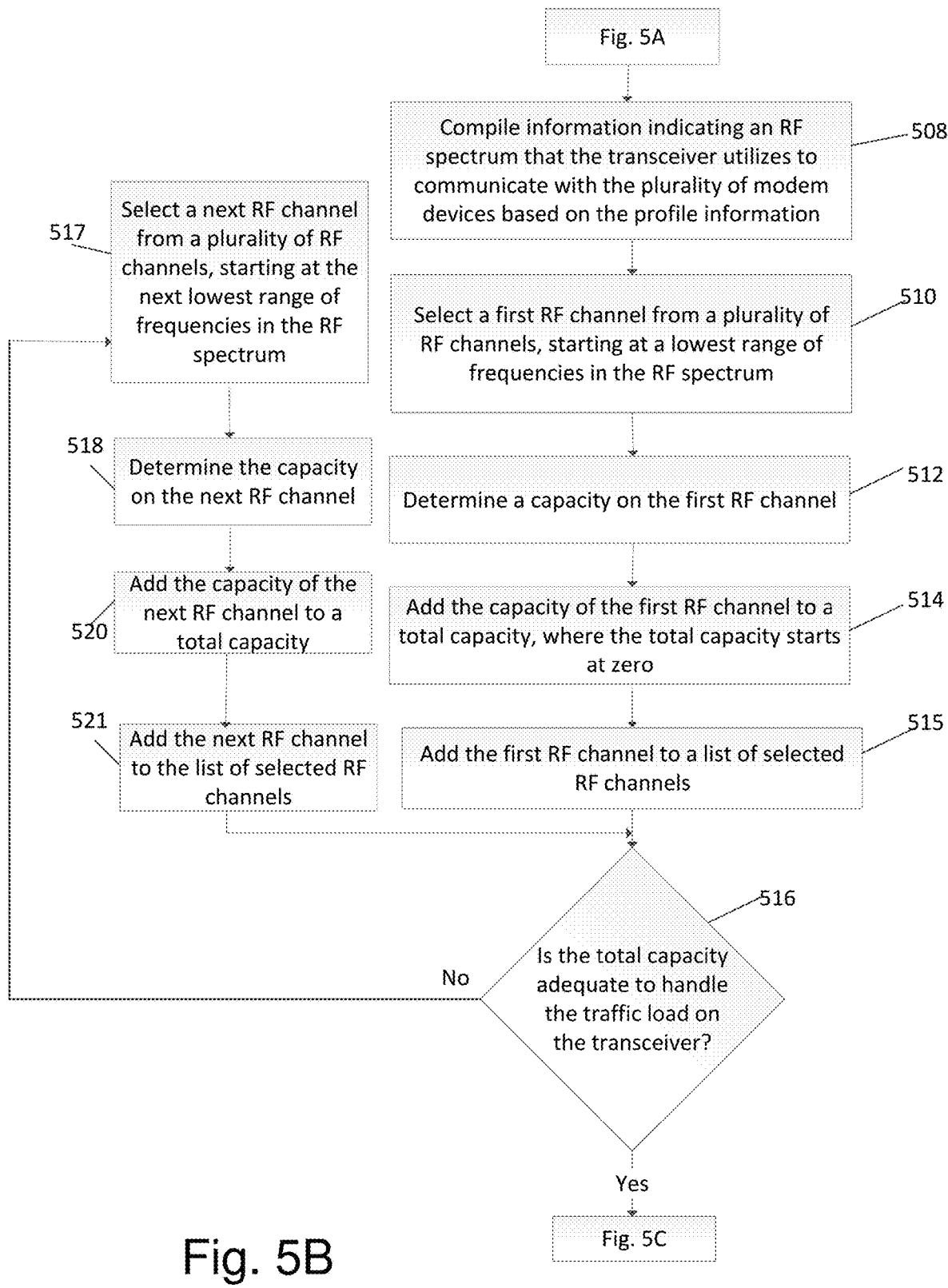
Figure 5C:
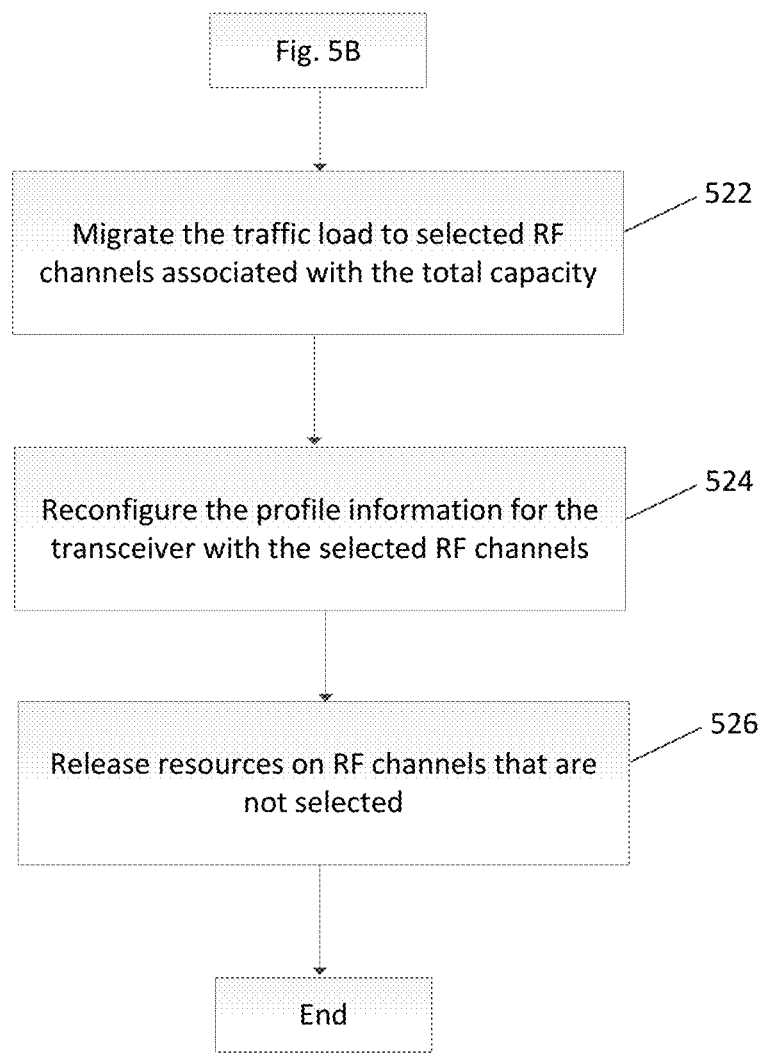

FIGS. 5A-C illustrate an example flow process for a CMTS in accordance with aspects disclosed herein. Any step may be performed in any order, may be omitted, and/or may be modified in some embodiments. As illustrated in FIG. 5A, at step 501, a container computing device ("container") may serve as a migration manager and may generate profile information for a transceiver associated with a plurality of modem devices. For example, a container such as containers 420 in FIG. 4, may generate profile information for the transceiver such as RPHY 440 and 450 associated with a plurality of modem devices such as modem devices 460 and 470. The profile information may indicate the RF channels that the modem devices may be assigned to communicate with the transceiver. The profile information may indicate a frequency map indicating a frequency range in the RF spectrum for each of the upstream and downstream RF channels that the modem devices are tuned to.

The profile information may include configuration information indicating the network route, the frequency map for the transceiver, the fiber/port configuration and switch information for the transceiver to use to connect to the network, and the blade server information associated with the transceiver.

The profile information may indicate resources serving the allocated RF channels for the transceiver. For instance, the profile information may indicate container configuration information such as the number of containers, the types of the containers, the identifiers and routing information of the containers serving the allocated RF channels for the transceiver. The container configuration information may also indicate a pool of backup containers that may serve as a hot back up for the active containers serving the allocated RF channels. In an event of a failure of an active container, a container in the pool of backup containers may be capable of multiplexing packets for any channel that the failed container serves and assume the role of the failed container. For example, the container in the backup pool may load the appropriate profile information such as parameters for RF channels to be served and tunnel session IDs for the data streams allocated on these RF channels, and send the packets downstream. To minimize the time to assume the role of the failed container and before there is a failure, a backup container may be loaded with the configurations such as the appropriate profile information to keep it warm/hot for backups.

At step 502, the container may set a migration threshold. For example, a container may set a threshold for preforming channel migration. In some embodiments, the container may take consideration of total capacity on all RF channels associated with the transceiver. The container may monitor a traffic load on the transceiver and trigger channel migration when the traffic load falls below a threshold percentage (such as 70%) of the total capacity. The threshold percentage may be configurable based on data type associated with an application on the RF channels and may be tuned to identify behaviors to trigger channel migration based on application tolerance and feedback. In some embodiments, the container may take consideration of the total capacity in combination with the data type of the data stream transmitted on the channels. For example, for unpredictable data such as voice data generated by phone calls, the threshold to trigger channel migration may be lower to allow space for the data expansion. Alternatively, for streaming video data with a steady expansion rate, the threshold to trigger channel migration may be higher.

Figure 7:
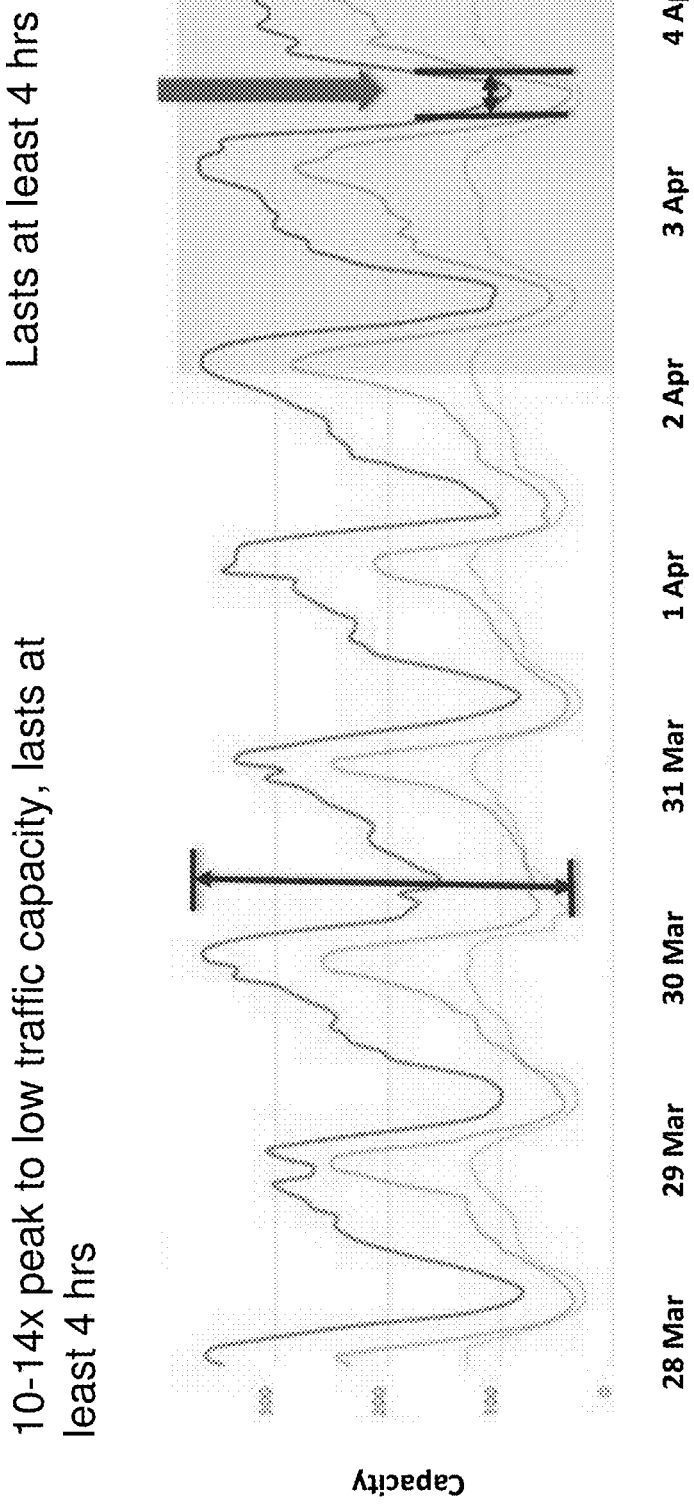
FIG. 7 shows an example traffic pattern analysis in accordance with one or more aspects disclosed herein.

At step 504, a traffic load on the transceiver may be monitored for a preceding time window. For example, a container may collect information on the traffic load on the transceiver in real time such as for minutes or hours in a preceding time window, or based on the types of the traffic. The container may use historical data as reference to facilitate the monitoring of the traffic load on the transceiver. For example, the container may use a historical data as illustrated in FIG. 7 to determine a pattern of traffic load on the transceiver to find a peak load and duration of the peak load as a reference. As such, a container may monitor the real time traffic load on the transceiver and wait till the peak load, and begin to monitor for opportunities for possible channel migration during the peak load.

At step 506, a determination may be made whether the traffic load is below the migration threshold. For example, a container may determine whether the traffic load monitored in real time is below the migration threshold. The threshold may be a pre-set value such as 70% of the total capacity to trigger the channel migration. Alternatively, the container may use history data as reference and if the traffic load monitored in real time falls below a certain percentage of the historic load, and may use this triggering event for a channel migration.

If the traffic load is not below the migration threshold, process 500 goes to step 504, where a container may continue to monitor the traffic load on the transceiver. If the traffic load falls below the migration threshold, process 500 proceeds to step 908 in FIG. 5B, where information may be compiled indicating an RF spectrum that the transceiver utilizes to communicate with the plurality of modem devices based on the profile information. For example, a container may compile information indicating the range of the RF spectrum for the RF channels allocated for the transceiver and the capacity of each RF channel to handle the data packets transmitted downstream from the head end to the modem devices.

At step 510, a container may select a first RF channel from a plurality of RF channels, starting at a lowest range of frequencies of the RF spectrum. For example, a container may select a first RF channel at the lowest range of frequencies of the RF spectrum, given that the compiled range information may indicate the available RF channels configured for the transceiver and the corresponding RF channel buffers to be used by the containers to transmit the data packets. As in the example illustrated in FIG. 3B, the container may select Channel 1, which has the lowest range of frequencies, as a first RF channel.

At step 512, a capacity on the first RF channel may be determined and at step 514, the capacity of the first RF channel may be added to a total capacity, where the total capacity starts at zero. The total capacity represents a running total of the capacity of the consolidated low-frequency channels after the channel migration. For example, a container may determine a capacity on the first selected RF channel and add the capacity of the first selected RF channel to a total capacity of the selected channels.

At step 515, the first RF may be added to a list of selected RF channels. For example, a container may add the first RF channel to a list of selected RF channels, which may be a subset of the plurality of RF channels. The list of selected RF channels may be used to carry the consolidated traffic migrated from the original RF channels such as Channels 1-12 in FIG. 3A. As in the example illustrated in FIG. 3B, the container may add Channel 1, which has the lowest range of frequencies, to the list of the selected RF channels.

At step 516, a determination is made whether the total capacity may be adequate to handle the monitored traffic load on the transceiver. For example, a container may determine whether the total capacity on the selected RF channels exceeds a usage requirement of the monitored real time traffic load on the transceiver.

If the total capacity does not meet the usage requirement, the process may proceed to step 517, where a next t RF channel may be selected from the plurality of RF channels, starting at the next lowest range of frequencies in the RF spectrum. At step 518, the container may determine the capacity of the next RF channel; at step 520, the capacity of the next selected RF channel may be added to the total capacity; and at step 521, the container may add the next RF channel to the list of selected RF channels. For example, in FIG. 3B, a container may select Channel 2 as the next RF channel and add Channel 2 to the list of selected RF channels, which now includes Channels 1-2. The process may subsequently return to step 516 to determine whether the total capacity of Channels 1-2 is adequate to handle the traffic load on the transceiver. For example, a container may determine the selected RF channels and the total capacity of the selected RF channels. A container may perform a comparison between the total capacity of the selected RF channels and the monitored real time traffic load on the transceiver. The container may determine whether the total capacity exceeds the monitored real time traffic load on the transceiver. In the example illustrated in FIG. 3B, the container may determine whether the total capacity of Channels 1-2 is adequate to handle the traffic load on original Channels 1-12. If the answer is no, the process returns to step 517 and a container selects the next RF channel with the next lowest range of frequencies (such as Channel 3) to add to the list of selected RF channels. The process may repeat for another iteration until Channel 4 is added to the list of selected RF channels.

If the total capacity of the selected RF channels is adequate to handle the monitored traffic load, the process proceeds to step 522 in FIG. 5C, where the container migrates the traffic load to the selected RF channels. When a utilization of a first RF channel is lower that a threshold utilization, a parameter such as Service Level Agreement (SLA) of delay tolerance for a service group that can be satisfied by a second RF channel, then data packets destined for the first RF channel are migrated to the second RF channel. If packet sizes are smaller than a threshold size in either the first RF or the second RF channel, then migrating data packets into a single RF channel may result in larger packet size and slightly larger transmission delay such as increased end to end latency. During off peak hours this increased delay may be acceptable. In the example of FIG. 3B, the container may determine that the total capacity of selected RF Channels 1-4 is adequate to handle the traffic load and start to consolidate the traffic load to Channels 1-4. For instance, upon receiving a service flow of data packets from the traffic manager, instead of using Channel 5 as configured in the original profile information, a container may direct the data packets to use Channel 3 of the selected RF channels. Accordingly, the traffic load is migrated from a higher frequency channel (such as Channel 5 in FIG. 3B) to a lower frequency channel (such as Channel 3 in FIG. 3B). The assignment of the data packets may take consideration of data types of the data packets in the service flow, such as assigning video data to a subset of selected RF channels and voice data to another subset of selected RF channels. For instance, Channel 3 in FIG. 3B may be reserved for video data and a container may consolidate all video data in the traffic load to Channel 3.

At step 524, a container may reconfigure the profile information for the transceiver indicating the selected RF channels. For example, a container may update the profile information for the transceiver with the newly selected RF channels such as Channels 1-4 in FIG. 3B, and direct the modem devices to tune to these RF channels, so that the modem devices may communicate with the transceiver on the selected RF channels. The container may update the profile information indicating the selected RF channels and frequency mapping information, the network route for the newly selected RF channels, the frequency map for the transceiver, the fiber/port configuration and switch information for the transceiver to use the selected RF channels. The container may also update the profile information indicating resources such as the containers supporting the newly selected RF channels.

At step 526, a container may release resources on non-selected RF channels. For example, a container such as a migration manager may release the containers supporting the non-selected RF channels, and the released containers may be turned off to preserve power or re-shuffled to serve the RF channels configured for other transceivers. In the example illustrated in FIG. 3B, the migration manager may release the containers supporting Channels 5-12. For the list of selected Channels 1-4, the migration manager may configure a plurality of containers to support the selected RF Channels 1-4. In addition, a pool of hot backup containers may be maintained in the profile information for these channels. As such, a container may pre-provision a network route for the pool of hot backup containers so that when a container active in the network fails to support an RF channel, a hot backup container may promptly capture the work load of the failed container and assume a role of an active container engine in the network to operate the selected RF channels. The hot backup container may load the appropriate profile information such as parameters on the RF channels and session IDs of the data streams, and send the packets downstream. To minimize the time to assume the role of an active container and before there is a failure, the hot backup containers maybe loaded with the configuration to keep them warm/hot for backups.

Described herein are aspects directed to microservices architecture for an interface (e.g., termination system) that may decouple the traffic scheduling from a fixed frequency and/or time period. Aspects described herein may dynamically steer devices (e.g., modems) to use a lower part of the RF spectrum based on a level of traffic (e.g., if the traffic load is low and/or lower than a threshold amount) given that that RF channels allocated at the lower frequencies tend to require less power than those allocated at higher frequencies. Aspects described herein may also enable one or more resources, components, and/or devices to power down (e.g., utilize less power, power down, power off, etc.) for a period of time based on the level of traffic.

According to some aspects, the system herein may implement a termination system via one or more container computing devices. These containers may operate one or more RF channels. A container device may receive one or more packets from a traffic manager device. The containers may be scalable. For example, the number of containers may be increased based on the amount of traffic load.

For example, under DOCSIS, up to four upstream channels to carry data upstream from a cable modem (e.g., a cable modem in an end user's home) to a termination system (CMTS) can be defined. The channels may be placed at locations in the spectrum that offer the best clarity (which can vary from headend to headend, for example), and can have different bandwidths and modulations, depending on the signal characteristics of the particular provider's system. For example, upstream channels may occupy a portion of the spectrum (e.g. a frequency range lower than 54 MHz) such as 200 kHz, 3.2 MHz or 6.4 MHz of the spectrum, and can use various types of modulation (e.g., QPSK, 16-QAM, 32-QAM, 64-QAM, and 128-QAM) to carry data on the upstream channel.

Another portion of the spectrum (e.g., 54-806 MHz) may be used for downstream communications from the CMTS to the home's modem. Similar to the upstream portion, the downstream portion may also include a number of distinct channels used to transmit downstream information. The frequency range may overlap with the original 6 MHz channels 2-69 specified by the NTSC, so the downstream channels may conveniently be defined to correspond to those NTSC channels. The downstream channels may use the same modulation rates as in the upstream channels, although the downstream channels may often use the higher modulation rates (e.g., 32-QAM, 64-QAM and 128-QAM) and downstream signal quality may be better than upstream.

A third portion of the spectrum (e.g., 850-1000 MHz) may be used for communications within the home. For example, the MoCA standard defines various channels and modulations for use in this typically higher-end frequency range. Devices within the home can communicate on those frequencies without disturbing the upstream/downstream CMTS traffic being carried on the 5-42 MHz upstream and 54-806 MHz downstream.

Aspects described herein may include a channel scheduler device. The channel scheduler device may determine which RF channels to use to transmit network traffic. According to some aspects, the channel scheduler may determine these RF channels based on one or more factors, such as time of day, traffic load, historical traffic load, etc.

Aspects described herein may include a downstream RF channel steering device. The downstream RF channel steering device may manage one or more channels (e.g., primary channels) across one or more interface devices (e.g., modems) that may be capable of tuning to one or more different RF channels. For example, a modem may be configured or have the capability to tune to one RF channel, four RF channels, 8, RF channels, 16 RF channels, 24 RF channels, etc.

A traffic manager device may classify packets into service flows, may determine and/or apply scheduling/delivery for the one or more packets, and may buffer the one or more packets before sending the one or more packets to the container.

According to some aspects, processing on a per multiplex basis may be avoided using the one or more container devices as described herein. For example, during times of lower traffic load (e.g., off peak times), random mixes of multiplexes may be operating. Aspects disclosed herein may be used to determine which one of these multiplexes may be turned off or powered down, which may save processing power and energy usage. According to some aspects, redundant processing may be provided higher in the network, which saves power and space. For instance, during the time of lower traffic load in off peak times, the traffic load may be consolidated in the lower frequency RF channels, such as Channels 1-4 in FIG. 3B, while reserving the higher frequency channels (such as Channels 5-12 for redundant processing in the event that there is a surge in the traffic load. Using one or more containers enables the multiplex processing to be anywhere in the network, such as anywhere a destined remote PHY (physical layer) device is reachable via the network 100 (FIG. 1). Disclosed aspects may easily handle surges in network traffic by adjusting the number of containers active in the network and the number of RF channels.

The foregoing methods and other methods described herein may be performed by a system, a computing device, a computer readable medium storing computer-executable instructions for performing the methods, and/or an apparatus having a processor and memory storing computer-executable instructions for performing the methods.

Aspects described herein may include a microservices architecture of an interface device (e.g., interface 104), which may be a termination system, such as a cable modem termination system (CMTS). According to some aspects, a CMTS device may comprise a physical device that may execute executable instructions (e.g., software) running on the CMTS. Embodiments described here may include a CMTS that may be an interface system (e.g., CMTS system) that might not include the CMTS executable instructions running on a single physical device and/or might not include or be related to a specific chipset. For example, the CMTS executable instructions may run or execute on one more modular complements or servers, and may run or execute as an independent system by interacting with other servers or modular components via application program interfaces (APIs) or other routines or protocols. In one example, these servers may be blade servers. In another example, the CMTS executable instructions may run in the cloud. For example, in the cloud example, the physical RF might not be made or generated in the cloud, but another device (e.g., a remote physical device) may generate or make the physical RF by converting the signals to RF, but might not, for example, perform DOCSIS scheduling.

According to some aspects, a remote physical device (RPHY) might be configured, capable of, and/or programmed to convert RF signals into packets. The RPHY may be located next to one of the servers executing the CMTS software or could be located at another location, such as miles apart from the server and/or downstream from the server. The RPHY may be a node with a remote physical device (RPD). The RPHY device may receive fiber signals as input and may output coax (e.g., RF) signals. For example, a blade server may send a 10-gigabit link to the RPHY device. The blade server may be plugged into a network switch, and that network switch may run a 10 gigabit link to a remote find device (RFD), which may convert that into digital DOCSIS data (e.g., RF signal) and may send the DOCSIS data down the RF plant.

Aspects herein may be associated with the modular head-end architecture specification (e.g., MHAV2). For example, the CMTS may be physically broken up between a remote find device (RFD) and the CMTS core. One or more aspects may use a microservices infrastructure to build the CMTS core. The microservices infrastructure may include one or more software modules that each may handle one leg of the plant, one node, or one remote find device. These software modules may be a suite of modules each serving a single node. The microservices infrastructure can effectively optimize service, reduce power, and/or provide a higher system efficiency. According to some aspects, the microservices infrastructure may provide for a higher availability. For example, when a software upgrade is available, one microservice group may be upgraded at a time instead of upgrading multiple service groups. This may provide an advantage because different service groups may run on different versions of the CMTS software. This provides higher performance and availability of different service groups. In another example, the local office 103 may be able to manage the power downstream on a service groups by service group basis via the individual QAM that a node might be implementing.

According to some aspects, the local office 103 may cluster or group customers (e.g., cable modem or client devices, etc.) according to one or more characteristics. For example, high bandwidth users, corporate users, users that might have a higher level of service may each be grouped into one of the microservices architecture. The CMTS system may then be able to provide structures or specialized sub-architecture within a node to provide customized experiences based on the group of which the user is a member. The local office 103 may optimize the CMTS for an expected level of traffic by configuring the microservices architecture in the CMTS. For example, if the node is for a busy area (e.g., downtown or densely populated area), the local office 103 may change the RF spectrum of that particular node to give it more DOCSIS and less video traffic than versus, for example, a node serving a more residential area. According to some aspects, the optimization may depend on the environment (corporate, residential, etc.) or the expected mix of customers within that environment (e.g., video users, email users, etc.). The local office 103 may optimize based on packets size (e.g., allowing smaller or larger packets) and/or for limiting or allowing more upstream vs. downstream bandwidth.

According to some aspects, the local office 103 may perform load balancing based on the microservices architecture. For example, a node servicing a downtown area during the daytime may get a lot more traffic from businesses. In such a scenario, the local office 103 may load balance and may distribute services across a larger variety of microservice routines or implementations to the downtown area. In the evening, the traffic may drop to a very low level in the downtown area, and the local office 103 may reallocate these microservice routines or implementations to residential areas and services that may have more traffic in the evening (e.g., when more people are in their homes). In another example, the local office 103 may load balance based on a microservice per area on a different blade server than a blade server that is currently servicing an area. For example, the local office 103 may have residential blade servers helping out or filling in on a blade server servicing a downtown area during a busy day. The local office 103 may add one or more cores or servers or may remove one or more cores or services from a microservice based on the traffic load of that service.

According to some aspects, the local office may allocate faster processors to a locality that may require the most processing. This may allow for saving on the cost of processors for the blade servers. In the off hours, for example, the power may be distributed, which may allow for a bunch of high power blade servers to areas as needed. The local office 103 may scale the number of CPU cycles for the registrations that have access to one or more databases (e.g., a key value store) associated with the local office 103. For example, the microservices may be running on CPUs and may have multiple processes running on the same CPU, which may be scheduled by the operating system. According to some aspects, for packet processing, the local office 103 may dynamically add more cores because, for example, there may be a need for more encryption. Referring back to the load balancing situation, there may be cores/servers running 3 GHz, which may provide better efficiency for handling 10 gigabit traffic. In the evening, the amount of traffic in the downtown area may fall below 10 gigabit, and the local office 103 may repurpose the 3 GHz cores to the residential area. This may provide a large power savings because the 3 GHz cores may process data better than a typical residential core (e.g., 1.5 GHz core). In some cases, the local office 103 may dynamically change the frequencies at which the cores are running depending on load balancing. For example, the local office 103 may change residential nodes to 1.5 GHz and maintain a downtown area at 3 GHz, and the local office 103 may make these changes without changing the processing or moving containers.

Disclosed aspects allow for easy transition from one microservice to another. Disclosed aspects allow for a quick and efficient changeover from one service to the next. For example, if a first microservice stops performing (e.g., for any reason), another microservice may be brought up to begin running very quickly. The CMTS includes one or more back up micro services that may be running and waiting to be implemented (referred to as a "hot backup"). These hot backups may be microservices that may be ready to go to process and output data. The hot backups might not be configured with configuration files, and the hot backups might not be outputting any information. According to some aspects, if a first microservice stops performing, a hot backup microservice may be switched over very quickly (e.g., less than a second). This may allow the CMTS to have a new container capture the workload of the failed microservice. For example, if a user is making a call (e.g., voice over IP or any call) to an emergency service, if one of the microservices fails, the call might not be dropped because a hot backup microservice can be switched over and provisioned in time so that the emergency call might not be dropped. According to some aspects, the system may schedule scale up/down of the individual container services.

A container orchestration might maintain a pool of one or more of these hot backup microservices. The pool may contain one backup per active, non-backup microservice. According to some aspects, the pool may contain fewer or more than one backup per active, non-backup microservice. For example, the container orchestration may fill in a gap for a non-performing microservice with one of these backups. At the time of switch over, the connection may need to be maintained so that the new microservice can receive that connection. The local office 103 may program the network fabric (e.g., routers) at the same time (or at substantially the same time) the local office 103 may program the container. For example, the end point (e.g., the cable modem doing the call) might not know that the cable modem was switched from one microservice to another. Instead of sending these packets from this modem to an IP address to be processed at a CMTS, disclosed embodiments might send the packets to another device that might know that that device is supposed to get the traffic. This may enable the connection to be unable to be dropped, and the TCP connection may stay up and running. The CMTS system may detect the failure of a microcontainer using container orchestration software, and may use a network controller mechanism (e.g., open network operating system (ONOS) that may use open flow to pre-provision the routes inside the network fabric. The network controller mechanism may hold the call open, and the call might not be able to be terminated in the transfer. According to some aspects, the packets from the call might be dropped and might not be ACK'ed. The TCP may re-try the call, and the routing in the network fabric may be reprovisioned before the TCP connection might timeout. According to some aspects, the call might actually be dropped, but the TCP link may stay open for a time period (e.g., a few milliseconds).

Aspects described herein may include a time and load aware channel scheduler device, which may shuffle traffic on RF channels based on one or more input factors, such as time of day, traffic load, historical traffic load, and the like. According to some aspects, signals in the higher frequency spectrum may require more power than signals in the lower frequency spectrum. By switching down to the lower frequency RF channels at off times, for example, the system may reduce the overall power draw by the network, which may save power and allow for the system to reduce voltages on the processors and increase the lifetime of the servers. For example, if an event prevents people from getting to work (e.g., a parade, etc.), the local office 103 may switch to higher RF channels. According to some aspects, a reactive model may be configured based on the historical demand traffic. For example, for a particular holiday, the local office 103 may add heuristics that may be based on the holiday traffic from a previous year or years. For example, the local office 103 may know what the pattern of traffic looks like, and may apply that pattern to the current holiday, but might not base the current bitrates on the bitrates from the previous year or years.

Aspects described herein may include a downstream radio frequency (RF) channel steering mechanism and/or device, which may manage one or more channels (e.g., primary channels) across multitude of modems capable of tuning to different number of RF channels. For example, these modems may be callable of tuning to a combination of 4 channels, 8 channels, 16 channels, 24 channels, etc. under one CMTS. According to some aspects, there may be a service group (e.g., a group of modems). For example, out of 300 modems, 200 may be 4 channel modems (e.g., downstream channel), 25 may be 8-channel modems, 25 may be 16 channel modems, and 50 may be 24 channel modems. A scheduler may reserve a frequency spectrum that may be 24 channels. The scheduler may allow the lower part of the spectrum for the lower 4 channels, add 4 more channels for the 8-channel modem, and so on until the full spectrum may be covered for the 24-channel modem. When the 24-channel modem requests data, the local office 103 may isolate the traffic to the higher end frequency spectrum so that the 24-channel modem receives priority for this data. The local office 103 may also use a common share channel between the 4 channels, 8 channels, and 16 channels. Aspects described herein assign traffic at the very low end of the spectrum to the lower 4 channels, so that there is priority for the 24 channel modem users (e.g., these users may pay a higher amount for the high-end speed) to use the higher frequency spectrum. The optimization may take place by not making the higher end spectrum available when there may be traffic that can go to the lower end (e.g., 4 channel or 8 channel).

According to some aspects, the local office 103 may be able to reduce the battery backup capacity to last for some period of time. The local office 103 may optimize toward the lower end of the spectrum (as discussed above), the system may carry a subset of the typical traffic, and the whole RF spectrum might not be needed to be accounted for. This may reduce the need for a higher battery backup. According to some aspects, the local office 103 may degrade modems (or users) based on a priority based on the battery power. For example, the local office 103 may degrade the residential customers before the higher end customers as the battery power goes down. According to some aspects, the local office 103 may shift down to the lower frequency RF channels during off peak times to lower overall power because the higher frequency RF channels may use more power than the lower channels.

The CMTS may include a plurality of microservices, such as a control microservice (CMTS-C), a management microservice (CMTS-M), a data plane microservice (CMTS-D), a match maker microservice, and a life cycle manager. The CMTS-D may be the data plane for sending data downstream and for sending data upstream. The CMTS-C may be a controller, which may log and manage information (e.g., modem registrations, IP address, MAC address, etc.) in a database (e.g., a key value store) associated with the local office. For example, the CMTS-C may be configured to determine whether a modem drops out, is not polling, and the like. The CMTS-M may be an interface to the CMTS. For example, the CMTS-M may collect data and send data to other places. The CMTS-M may manage interaction for one or more CMTS components and/or operations teams. The CMTS-M may include a command line interface and/or graphical user interface.

The CMTS-D may correspond to or include a group of subcomponents or containers. For example, the CMTS-D may include encryptor functionality that may encrypt data to and from the containers. The CMTS-D may perform traffic management, which may include determining the downstream and instream flow scheduling. The CMTS-D may perform encapsulation and de-capsulation of packets and information. For example, in a DOCSIS framing scheme, the CMTS-D may encapsulate an IP packet in a DOCSIS packet, which may further be encapsulated in an IP packet. This packet may be sent to the remote find device (RPD). According to some aspects, a packet may be encapsulated a plurality of times and may have a plurality of packet headers (e.g., IP packet headers) that may be used in a scheme. According to some aspects, there may be a plurality of smaller CMTS-D components in a pool, where some may be encryptors, traffic mangers, and/or encapsulators/de-encapsulators. In some embodiments, the CMTS-D components may be arranged in series or step by step as a single microservice. For example, there may be a pool of CMTS-D's that may perform encryption on an incoming packet, and another pool that may perform encapsulation/de-encapsulation on the packet, and the packet may go to a load balance process performed by another pool, and to a traffic manager, which may schedule which QAMs the packet may go into. In this scenario, one thread may wake up and perform a function and may go dormant. This process may allow for accessing information in a more efficient manner from a cache and may protect against invalidating cache lines inside of a core or processor.

The matchmaker component may perform configuration processes and may connect a RPHY to a CMTS or may connect a MAC domain (i.e., modems in a grouping) to a CMTS. The matchmaker may associate a RPHY or a MAC domain to a corresponding container. The matchmaker may indicate to the RPHY device which scheduler to use. Disclosed systems may detect where the RPD may be located in the system and may determine capacity in the available microservices. For example, the local office 103 may determine for the matchmaker component configuration information, such as what network may be associated with the RPD. The local office 103 may determine the frequency maps to use, which fiber to use on which port on which switch, which blade servers to use, and the like. The matchmaker may use this information to configure the CMTS by giving that information to the CMTS-C. The matchmaker might not be pre-provisioned and may match the CMTS-C to an RPD on demand. Doing on-demand matching may result in less errors because the pre-provisioned way may be associated with having different components working in different places, and if one might not work correctly, it may affect other components downstream (or upstream). In addition, the local office 103 may use on-demand matching or discovery to determine whether modems are supposed to be connected to a network (such as at a particular location) and may allow real-time verification of the overall system architecture and may eliminate misconfigurations. The vCMT may be in a plug and play configuration. In one example, if a utility pole or plant goes down, the local office 103 may determine in real-time how many modems may be affected, where the modems may be located, which nodes may be affected, and which modems are supposed to be on that port for that pole, and the like.

The life cycle manager may manage the lifecycle of a remote PHY device. For example, the life cycle manger may configure the remote PHY device via a plug and play, such that the remote PHY device may be plugged into the network, may boot up, may register, may run health checks and telemetry reports, and may run the device. According to some embodiments, the life cycle manager may perform inventory management to determine whether an RDP may be one that may be associated with the local office 103 (i.e., and not some rogue or unapproved RDP device). The life cycle manager may determine that there might not be two of the same devices on a plant. For example, a user may climb up a pole, may comb the RDP, and may try to put another device on the plant using the combined information from the RDP (i.e., perform hacking on the RDP associated with the local office 103). If the life cycle manager determines that there may be two of the same devices (i.e., having the same or similar characteristics) on the plant, the local office 103 may follow up to determine whether an unapproved device is on the plant or may render the unapproved device inoperable.

Figure 6:
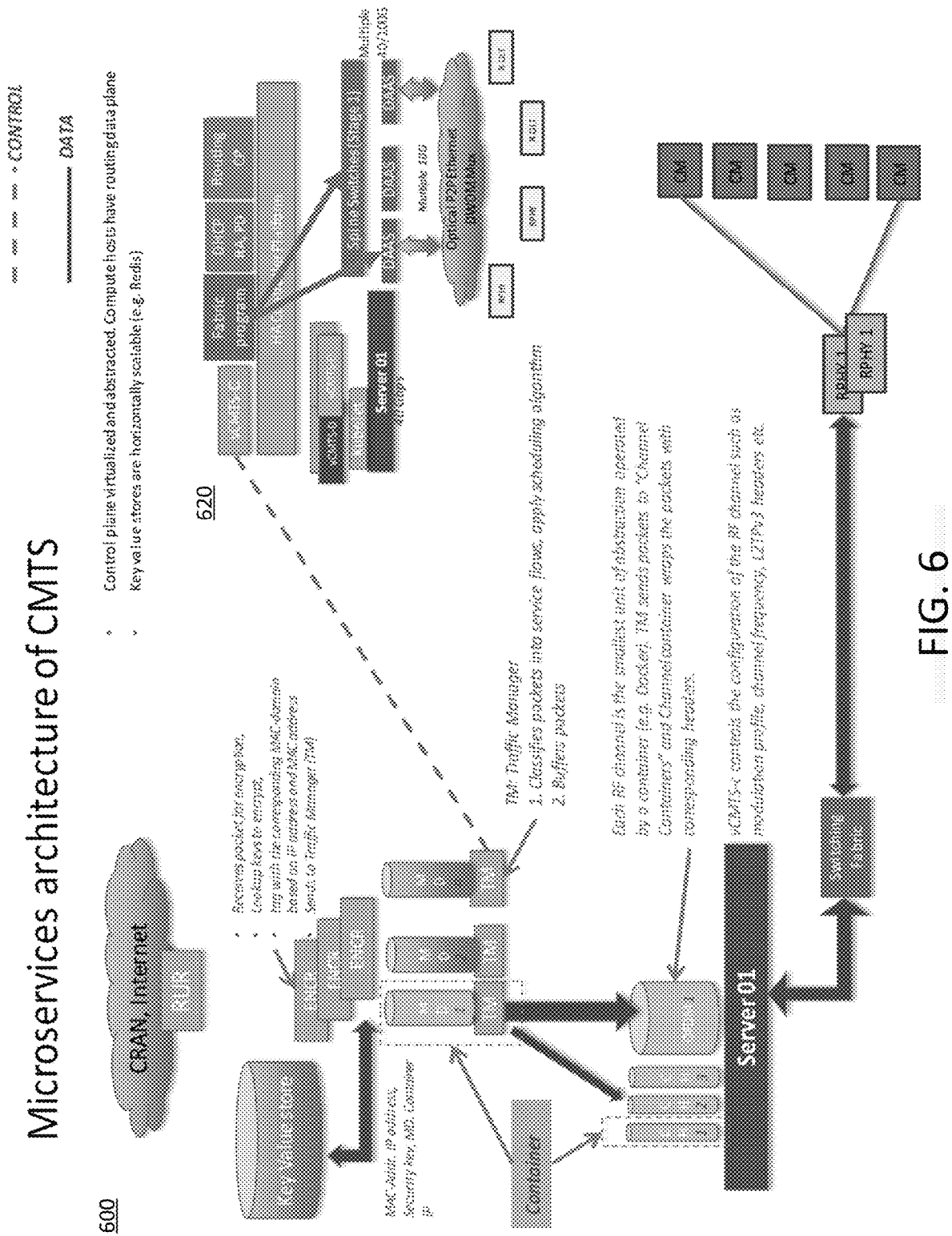
FIG. 6 illustrates an example schematic block diagram of a microservices architecture system for an interface in accordance with one or more aspects disclosed herein.

FIG. 6 illustrates a schematic block diagram of a microservices architecture system 300 for a CMTS in accordance with one or more aspects disclosed herein. System 300 may comprise one or more cable modems communication to a RPHY, and may show the RPHYs going through a switching fabric of servers where one or more containers may be running.

System 600 may include a detailed view or break out of a container, which may illustrate how each of the channels may be generated and configured. In one example, for a 24 QAM modem, the system 300 via the traffic manager (TM) may break down data into 188 byte packets that may go down the QAM channels. The first 188 bytes may be put into a first channel (i.e., channel 1), and the next 188 bytes into channel 2, and so on. This allows for the DOCSIS frame to be downloaded in multiple channels in parallel.

According to some aspects, the RF channel may be the smallest unit of abstraction operated by a container. In some embodiments, the container may be Docker, Rocket, or Alexi, or some other engine that may be used to isolate processes and package them. There may be multiple RF channels on the RPHY and the RPHY may send packets that may correspond to a particular frequency channel. The frequency channel may be, for example, 6 megahertz, 96 megahertz, 192 megahertz, etc. FIG. 6 shows channels 1, 2, and 3, and each channel may correspond to a 6 megahertz portion of the spectrum. For example, packets that may land in a tunnel may correspond to a particular frequency spectrum. The local office 103 may map channel 1 to 720 to 726 megahertz, channel 2 to 726 to 732 megahertz, etc. For example, during the scheduling of data, the local office 103 may migrate the traffic load off the higher frequencies (and save power) by releasing the containers corresponding to these higher frequency channels. Eliminating some higher frequency channels may allow the system 600 to reduce overall power and increase bandwidth on cable modem system. With reduced power, the system 600 may be able to push more information and reduce noise. With reduced power, the system 600 may be able to obtain a higher level of modulation across the RF network, such as upgrading modulation to 4k QAM.

The key value store may be a database for accessing data. For example, the key value store may store data via a key, such that particular data may be retrieved with a corresponding key. The key value store may store data associated with particular RPHY. The key may be hash codes or any other type of access key information.

According to some aspects, if a packet may be received by system 600, the system 600 may determine to which channel to assign the packet and send that packet for downstream delivery (e.g., depending on a priority, location, node, etc. associated with a requesting or destination cable modem). The system 600 may determine the MAC domain the packets is to be routed to, and may determine the encryption key to encrypt the packet for a particular modem on that MAC domain. If the packet is encrypted (e.g., via an encryptor), the encryptor may send the packet downstream with metadata so that the next component may strip off the data that that component may need, etc. This may prevent each component from having to look up all the data at the key value store at every step or level, which may result in increased efficiency.

The system 600 may include an edge router, which may be a residential united router (RUR). The RUR or the edge router may route information to and from the network. The RUR may be a pathway onto the internet for cable modems through the CMTS. The RUR may also communicate with other routers, such as peering routers, which may communicate with the internet. These routers may be part of a backbone associated with the local office 103's network.

Control plane portion 620 may illustrate a control plane of the system 600. Plane 620 may manage the operation of the CMTS. The control plane (e.g., CMTS) may be located miles apart from other components in the system 600. Regarding the hot backup example discussed herein, the fabric program may be used to access a hot backup so that a packet gets to a new container if an initial container fails. There may be one or more switches that may go out to the nodes. These switches may include a spine switch, a distributed access architecture switch (DAAS), and a leaf switch. The servers may connect to leaf switches, and the leaf switches may connect to the RUR, which may be how traffic comes downstream and may be routed to one of the containers. The data may be passed to spine switches, and to a plurality of DAAS switches, which may be connected to a plurality of RPHYs. The DAAS switches may comprise lasers that may be configured to communicate with the RPHYs. There may be a single point for each node or RPD. Each RPHY may terminate into one of these points.

According to some aspects, the system 600 (e.g., at plane 620) may include a microcontainer environment that may share a physical layer. The control plane 620 may include an optical line termination, which may be configured for DOCSIS over Ethernet provisioning. The leaf spine network may be used with QAM technology, with DOCSIS technology, or with 5G wireless base stations. For example, there may be a switch (e.g., a spine switch) that may feed an RPHY and a wireless modem.

The plane 620 may include a dynamic host configuration protocol relay agent (DHCP RA). For example, the system 600 or local office 103 may provide an IP address to a cable modem, and the DHCP RA may use this IP address to send information to (and to receive information). The local office 103 may use the DHCP RA to program the fabric so that future requests for a modem may be routed to the right CMTS container. For example, if the system 600 receives a response from the DHCP RA, the local office 103 may configure the switching fabric to send all future requests go to that container instead of trying to route it through a DAAS switch.

The plane 620 may include a DHCP prefix delegation (DHCP PD). For example, the response from the DHCP RA may be in IPv4, and the DHCP PD may provide a block of IPv6 addresses that the modem or gateway will provide to the premises equipment at a premises. According to some aspects, each premises device or equipment may be assigned an IPv6 address that may go right onto the internet such that a particular device may be targeted via the corresponding IPv6 address.

The plane 620 may include a routing control plane (Routing CP). For example, when the routing fabric (the RUR and the upstream routers) see an IP address, these components may determine the next hop or device to send a packet. A protocol that may be used may include BGP or ISIS. According to some aspects, the local office 103 may dynamically program the network using the routing control plane to ensure traffic reaches the local office and the correct cable modem.

FIG. 7 shows a traffic pattern analysis in accordance with one or more aspects disclosed herein. For example, in any period of time (e.g., 24 hours period), there may be peaks and/or valleys in traffic capacity. The local office 103 may determine load traffic, time frames, and may reallocate resources and/or reconfigure the network (e.g., frequencies, channels, bandwidth, cores, nodes, etc.) based on the load traffic (e.g., during a peak time and/or during a low valley). This may allow for savings in energy and reduce maintenance costs in the system.

FIG. 8 illustrates an example flow process for a CMTS in accordance with aspects disclosed herein. Any step may be performed in any order, may be omitted, and/or may be modified in some embodiments. The process in FIG. 8 may illustrate multiple ways to detect a quality of service that may be an early warning system that may indicate to the system or to the local office 103 that the system may need reconfiguring (e.g., as discussed above).

Figure 9:
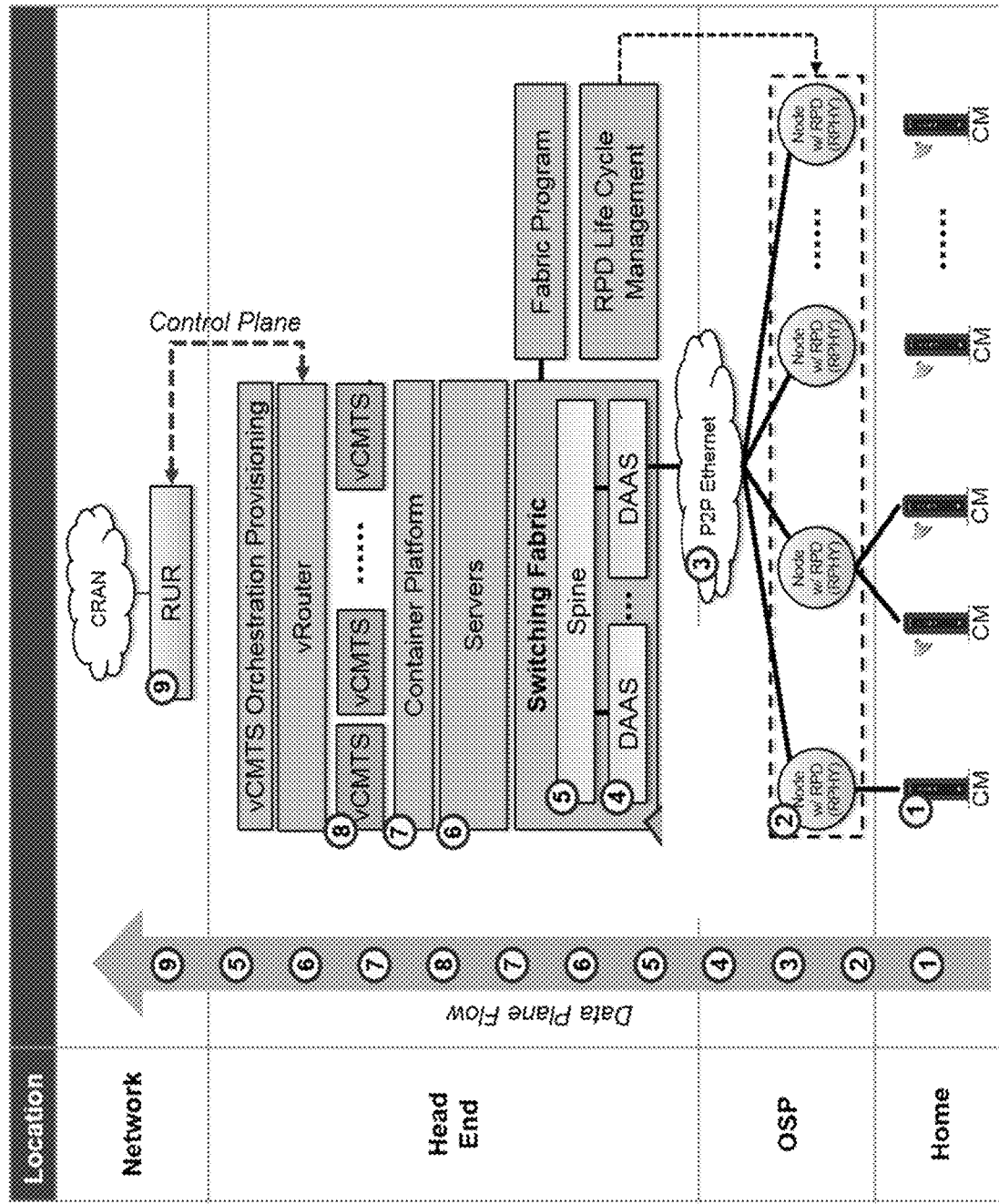
FIG. 9 illustrates an example schematic block flow diagram in accordance with one or more aspects disclosed herein.

FIG. 9 illustrates a schematic block flow diagram in accordance with one or more aspects disclosed herein. According to some aspects, the numbers 1-9 may illustrate a flow of a packet. For example, a packet may leave the cable modem and may travel up the RF channel to a RPHY (i.e., a node with a RPD). The packet may be sent (e.g., via 10 gigabit Ethernet layers) to a DAAS switch. The DAAS switch may send the packet to a spine switch. The spine switch may send the packet to the servers, which may have one or more containers executing on the servers (container platform). The CMTS may determine how to route a packet to the right container in the container platform based on channel frequency, priority associated with the cable modem, etc. (discussed above). The CMTS may decrypt the packet, de-encapsulate (e.g., de-DOCSIS-ize) the packet, turn it back to IP format, and send the packet to the RUR, which may send the packet to the internet. The process may be reversed for sending a packet to the cable modem.

Figure 10:
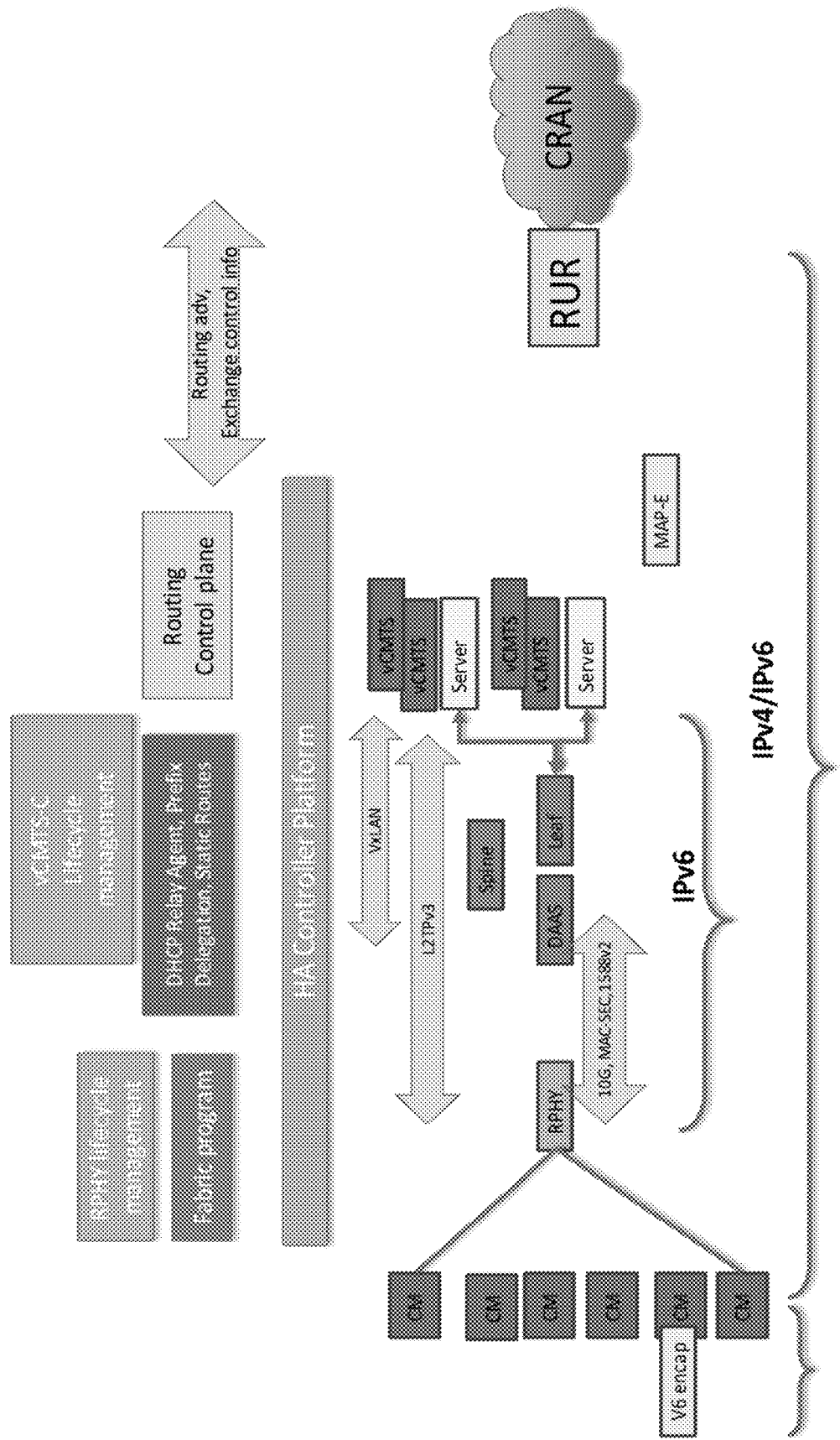
FIG. 10 illustrates an example end-to-end architecture system in accordance with one or more aspects disclosed herein.

FIG. 10 illustrates an end to end architecture system in accordance with one or more aspects disclosed herein. FIG. 10 may illustrate what an end cable modem may experience (e.g., receive and transmit) from the cable modem to the internet. A device at a home or other location (e.g., a computer, set top box, etc.) may have an IP address. The packet may travel between the IP address (e.g., user or client device) and for example, the Converged Regional Area Network (CRAN) that allows all voice, video, and Internet traffic to go over a single network with redundant 10 GigE networks. A packet going through the CMTS may be configured in DOCSIS framing. The local office 103 may use a protocol (e.g., layer 2 tunneling protocol version 3 or L2TPv3) to send a packet to the RPHY. The local office 103 may use this protocol to determine that the packet may be destined for a particular MAC address associated with a cable modem. The local office 103 may use a layer 3 based network or IP network. The local office may take a layer 2-based frame (e.g., an Ethernet frame or DOCSIS frame), and put that frame in another IP frame that may be sent through the leaf-spine switches. The frame may be sent to the RPHY. The local office may use layer 3 tunnels to process and pass layer 2 traffic. According to some aspects, the payload of the frame or message may include MAC information and/or DOCSIS intimation that may include the IP address. In some embodiments, the local office 103 may use or establish a VxLAN connection to get the packet to the correct DAAS switch. The local office 103 may use L2TPv3, which may allow the system to avoid reprogramming or real-time routing. The local office 103 may generate VxLAN tags to allow the output of the switch to go right to the DAAS, which, in some embodiments, may be performed without having to have access to the tables and routes for an individual modem. According to some aspects, there may be a 10 gigabit Ethernet physical interface between the RPHY and DAAS switches. FIG. 10 also illustrates MAC security (e.g., link layer security) and 1588v2 precision time protocol (PTP) timing, which may run over the 10 gigabit link. For example, the clock of the RPHY and the clock of the CMTS may be in sync when sending a packet out. For example, the CMTS may be 27 megahertz and the RPHY may also be 27 megahertz. The 1588v2 may be used by the local office 103 to determine whether one of these components is varying from the other, and may reconfigure one of the clocks.

Figure 11:
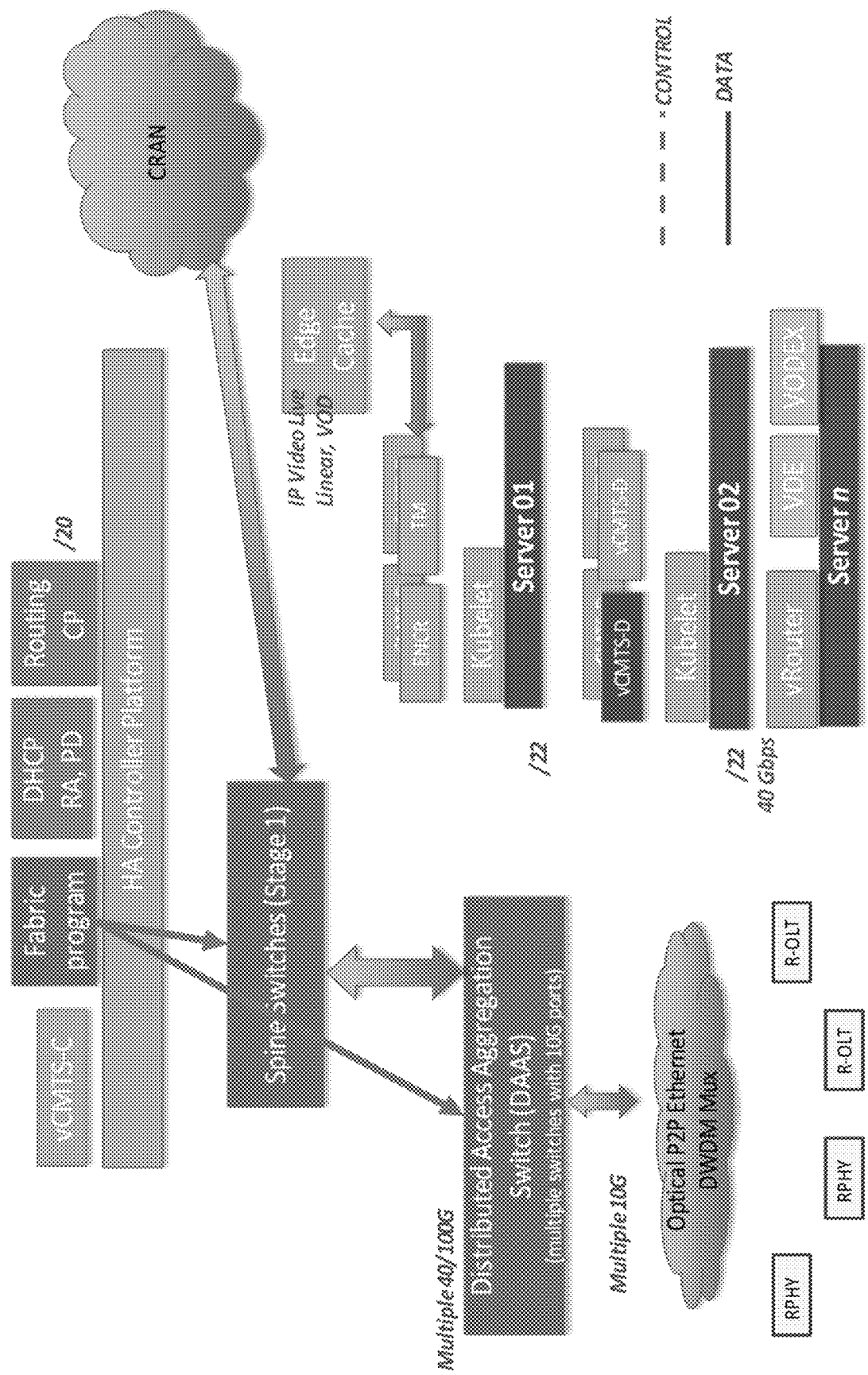
FIG. 11 illustrates an example interface infrastructure in accordance with one or more aspects described herein.

FIG. 11 illustrates an example CMTS infrastructure in accordance with one or more aspects described herein. FIG. 11 may illustrate scenarios where traffic (e.g., content) might not originate in or from the internet but may originate at the local office 103 (e.g., at a network provider). For example, the local office 103 may provide video traffic and packets to a cable modem. FIG. 11 illustrates an edge cache (e.g., a video distribution edge (VDE)) and a video on demand encryption and multiplexing component (VODEX), which may be part of a content delivery (e.g., video delivery, linear content, video on-demand, IP video, etc.) system provided by the local office 103. The local office 103 may provide this traffic over the same or similar infrastructure as internet traffic with a CMTS (described herein). FIG. 11 illustrates that content (e.g., video, other content) may be delivered over the CMTS instead of a QAM channel. According to some aspects, content (e.g., video, other content) may be sent to the RPD and may bypass the CMTS. The various features described above are merely non-limiting examples, and can be rearranged, combined, subdivided, omitted, and/or altered in any desired manner. For example, features of the computing device (including the remote control device and the terminal device) described herein can be subdivided among multiple processors and computing devices. The true scope of this patent should only be defined by the claims that follow.

The invention claimed is:

1. A method comprising:
monitoring, by a computing device, traffic loads on a plurality of channels that are used by a transceiver to communicate with a plurality of modem devices;
comparing, by the computing device, a traffic load on one of the plurality of channels with a channel migration threshold associated with the one of the plurality of channels;
comparing, by the computing device, a total traffic load on the plurality of channels with a total migration threshold associated with the plurality of channels;
migrating, by the computing device, data traffic from the one of the plurality of channels to one or more other channels of the plurality of channels based on the traffic load on the one of the plurality of channels being below the channel migration threshold and the total traffic load being below the total migration threshold, wherein different types of data traffic are migrated to different channels; and redirecting, by the computing device and to the one or more other channels, future requests associated with the transceiver to communicate with the plurality of modem devices.

2. The method of claim 1, further comprising:
determining the channel migration threshold based on a data type of data traffic on the one of the plurality of channels.

3. The method of claim 1, further comprising:
determining the channel migration threshold based on an expansion rate of data traffic on the one of the plurality of channels.

4. The method of claim 1, further comprising:
migrating the data traffic from the one of the plurality of channels to the one or more other channels after a determination that a packet size on the one of the plurality of channels is below a threshold.

5. The method of claim 1, further comprising:
determining the channel migration threshold based on a volatility of data traffic on the one of the plurality of channels.

6. The method of claim 1, further comprising:
configuring first microservices for a first set of users;
configuring second microservices for a second set of users, wherein the first set of users have a higher priority than the second set of users; and
assigning the first microservices to channels with higher frequencies; and
assigning the second microservices to channels with lower frequencies.

7. The method of claim 1, wherein the different types of data traffic comprise streaming data traffic and non-streaming data traffic, and wherein migrating the data traffic comprises:
migrating the streaming data traffic from the one of the plurality of channels to a second channel; and
migrating the non-streaming data traffic from the one of the plurality of channels to a third channel.

8. The method of claim 1, wherein migrating the data traffic from the one of the plurality of channels comprises:
reducing a bandwidth for microservices associated with streaming data service; and
increasing a bandwidth for microservices associated with non-streaming data service.

9. A method comprising:
configuring, by a computing device, a plurality of channels associated with a transceiver, wherein the transceiver communicates with a plurality of modem devices via the plurality of channels;
storing, by the computing device, a channel migration threshold associated with a traffic load on one of the plurality of channels;
storing, by the computing device, a total migration threshold associated with a total traffic load on the plurality of channels;
storing, by the computing device, migration rules on migrating data traffic from the one of the plurality of channels to one or more other channels of the plurality of channels based on the traffic load on the one of the plurality of channels being below the channel migration threshold and the total traffic load being below the total migration threshold, wherein the migration rules indicate that different types of data traffic are migrated to different channels; and managing the data traffic based on the migration rules; and
redirecting, by the computing device and to the one or more other channels, future requests associated with the transceiver to communicate with the plurality of modem devices.

10. The method of claim 9, further comprising:
determining the channel migration threshold based on a data type of data traffic on the one of the plurality of channels.

11. The method of claim 9, further comprising:
determining the channel migration threshold based on an expansion rate of data traffic on the one of the plurality of channels.

12. The method of claim 9, further comprising:
determining the channel migration threshold based on a volatility of data traffic on the one of the plurality of channels.

13. The method of claim 9, wherein migrating the data traffic from the one of the plurality of channels comprises:
reducing a bandwidth for microservices associated with streaming data service; and
increasing a bandwidth for microservices associated with non-streaming data service.

14. A method comprising:
migrating, by a computing device, data traffic from a first channel to a plurality of channels associated with a transceiver, wherein the transceiver communicates with a plurality of modem devices via the plurality of channels, and wherein the migrating is based on:
a traffic load of the first channel being below a channel migration threshold,
a total traffic load of both the first channel and the plurality of channels being below a total migration threshold, and
different migration rules for different types of data traffic;
updating, based on migrating, a migration threshold associated with one of the plurality of channels; and
redirecting, by the computing device and to the one or more other channels, future requests associated with the transceiver to communicate with the plurality of modem devices.

15. The method of claim 14, wherein migrating the data traffic from the first channel comprises:
reducing a bandwidth for microservices associated with streaming data service; and
increasing a bandwidth for microservices associated with non-streaming data service.

16. The method of claim 14, wherein updating the migration threshold associated with the one of the plurality of channels comprises:
decreasing the migration threshold associated with the one of the plurality of channels after determining that the one of the plurality of channels comprises streaming data traffic; and
increasing the migration threshold associated with the one of the plurality of channels after determining that the one of the plurality of channels comprises non-streaming data traffic.

17. The method of claim 14, wherein updating the migration threshold associated with the one of the plurality of channels comprises:

increasing the migration threshold associated with the one of the plurality of channels after determining that the one of the plurality of channels comprises volatile data traffic; and decreasing the migration threshold associated with the one of the plurality of channels to a lower migration threshold after determining that the one of the plurality of channels comprises non-volatile data traffic.

18. The method of claim 14, wherein the migration threshold associated with the one of the plurality of channels is updated based on a packet size of data traffic on the one of the plurality of channels.

19. The method of claim 14, wherein the migration threshold associated with the one of the plurality of channels is updated based on an expansion rate of data traffic on the one of the plurality of channels.

20. The method of claim 14, wherein the migration threshold associated with the one of the plurality of channels is updated based on a time of day.

* * * * *

UNITED STATES PATENT AND TRADEMARK OFFICE
CERTIFICATE OF CORRECTION

| | | |
|---|---|---|
| PATENT NO. | : 11,909,649 B2 | |
| APPLICATION NO. | : 17/672070 | |
| DATED | : February 20, 2024 | |
| INVENTOR(S) | : Gaydos et al. | |

It is certified that error appears in the above-identified patent and that said Letters Patent is hereby corrected as shown below:

In the Specification

Column 8, Line 53:
After "next", delete "t"

Column 13, Line 63:
Delete "micro services" and insert --microservices--

Signed and Sealed this
Twenty-ninth Day of April, 2025

Coke Morgan Stewart
*Acting Director of the United States Patent and Trademark Office*